US009239799B2

(12) United States Patent
Ingle et al.

(10) Patent No.: US 9,239,799 B2
(45) Date of Patent: Jan. 19, 2016

(54) MEMORY MANAGEMENT UNIT DIRECTED ACCESS TO SYSTEM INTERFACES

(75) Inventors: Ajay Anant Ingle, Austin, TX (US); Christopher Edward Koob, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 2065 days.

(21) Appl. No.: 12/146,657

(22) Filed: Jun. 26, 2008

(65) Prior Publication Data
US 2009/0327647 A1 Dec. 31, 2009

(51) Int. Cl.
*G06F 12/10* (2006.01)

(52) U.S. Cl.
CPC ......... *G06F 12/1027* (2013.01); *Y02B 60/1225* (2013.01)

(58) Field of Classification Search
USPC .......................................................... 711/207
See application file for complete search history.

(56) References Cited

U.S. PATENT DOCUMENTS

| 5,784,706 A | 7/1998 | Oberlin et al. |
| 5,860,146 A * | 1/1999 | Vishin ................. G06F 12/1027 710/3 |
| 2004/0128574 A1 * | 7/2004 | Ricci ..................... G06F 1/3203 713/320 |

| 2004/0225840 A1 | 11/2004 | O'Connor et al. |
| 2006/0085588 A1 | 4/2006 | Rajwar et al. |
| 2010/0100685 A1 * | 4/2010 | Kurosawa ........... G06F 12/1054 711/128 |

FOREIGN PATENT DOCUMENTS

| CN | 1554055 A | 12/2004 |
| CN | 1708742 A | 12/2005 |
| EP | 0817059 | 1/1998 |
| GB | 2386441 | 9/2003 |
| JP | 10091526 A | 4/1998 |
| JP | 2005310072 A | 11/2005 |
| JP | 2006522385 A | 9/2006 |
| TW | 417049 B | 1/2001 |
| TW | 508493 B | 11/2002 |
| TW | 587209 B | 5/2004 |
| TW | 591385 B | 6/2004 |

OTHER PUBLICATIONS

International Search Report—PCT/US09/047795, International Search Authority—European Patent Office—Sep. 22, 2009.
Written Opinion—PCT/US09/047795, International Search Authority—European Patent Office—Sep. 22, 2009.
Taiwan Search Report—TW098121707—TIPO—Jan. 24, 2013.

* cited by examiner

*Primary Examiner* — Jaehwan Oh
(74) *Attorney, Agent, or Firm* — Peter Michael Kamarchik; Paul Holdaway

(57) ABSTRACT

A memory management unit (MMU) for servicing transaction requests from one or more processor threads is described. The MMU can include a translation lookaside buffer (TLB). The TLB can include a storage module and a logic circuit. The storage module can store a bit indicating one of a plurality of interfaces. The bit can be associated with a physical address range. The logic circuit can route a physical address within the physical address range to the one of the plurality of interfaces.

28 Claims, 9 Drawing Sheets

MEMORY MANAGEMENT UNIT DIRECTED ACCESS TO SYSTEM INTERFACES

FIELD OF THE DISCLOSURE

Embodiments of the inventive concepts disclosed herein relate generally to the field of data processing systems. More particularly, embodiments of the inventive concepts disclosed herein relate to memory management units that can direct access to one or more interfaces.

BACKGROUND

Data processing systems can include various components that interact with each other to process an instruction. One component may be a memory management unit (MMU) that can manage retrieval of data and/or instructions from a physical memory upon a transaction request by one or more processor threads of a processing unit. Some data processing systems use virtual addresses to improve retrieval efficiency. For example, a thread may generate a transaction request that includes a virtual address for data or instruction and supply the virtual address to the MMU. The MMU can translate the virtual address to its corresponding physical address to access the data in physical memory. In some MMUs, a look-up table maps a virtual address to a physical address, such as in a translation lookaside buffer (TLB).

The transaction request can be routed to the resource that includes pages corresponding to the physical address via an interface, also known as a channel, such as a bus. Data processing systems can include different interfaces for accessing different system resources. A buffer, such as a first in first out (FIFO), can manage the physical addresses and determine the interface to which to provide each physical address for accessing a resource. For example, a buffer can be coupled to a TLB to receive the physical addresses and provide them to an address decoder that identifies the interface on which to provide each physical address to access a resource.

The interfaces are coupled to the resources. Each interface may have different characteristics, such as speed or bandwidth, for routing physical addresses of the transaction requests. Differing characteristics may cause physical addresses to back-up in the buffer and delay processing even if new transaction requests for different resources are provided by the TLB. For example, a physical address to access a first interface may fill the buffer because the first interface is being used to access a resource. Physical addresses for routing on other interfaces or the first interface may be backed-up because the buffer is full. Furthermore, the address decoder is activated for every access using a physical address to one of the interfaces, consuming power with each access.

Accordingly, a memory management unit system and process is desirable that can route physical addresses to interfaces and decrease processing delays, decrease power consumption, and/or provide better quality service to a processor.

SUMMARY OF THE DISCLOSURE

In an embodiment, a memory management unit that includes a translation lookaside buffer (TLB) is described. The TLB includes a storage module and a logic circuit. The storage module can store a bit indicating one of a plurality of interfaces. The bit can be associated with a physical address range. The logic circuit can route a physical address within the physical address range to the one of the plurality of interfaces based on the bit.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to a memory management unit (MMU) that includes one or more translation lookaside buffers (TLBs) for managing transaction requests based on information in at least one of the TLBs. The information can include a bit received from an address decoder that identifies an interface to provide a physical address corresponding to a virtual address of the transaction request. The bit can be used to determine an interface on which to route the physical address for accessing a resource without requiring a buffer and address decoder after the TLBs that may delay processing or consume power. Examples of interfaces include tightly-coupled memory (TCM), a cache bus, such as AXI/L2 by ARM, Ltd., and advanced high-performance bus (AHB). A physical address may include a physical page number that identifies a block of memory having a predetermined size.

In one embodiment, the MMU includes a TLB that is a micro translation lookaside buffer (μTLB). The μTLB can receive a bit from an address decoder and associate it with a physical address range in the μTLB. For example, the address decoder may use system-on-a-chip (SOC) memory map strappings to analyze the physical address and generate a bit identifying an interface based on the SOC memory map strappings. SOC memory map strappings may be predefined characteristics associated with memory built-in on a semiconductor device such as an integrated circuit. Examples of memory map strappings include chip pinouts for memory page locations, fuses burned in the chip during manufacturing, and programmed logic added by the chip manufacturer. When a transaction request that includes a virtual address is received by the µTLB, the bit is used to identify the interface on which to route the physical address for accessing the resource.

Figure 1:
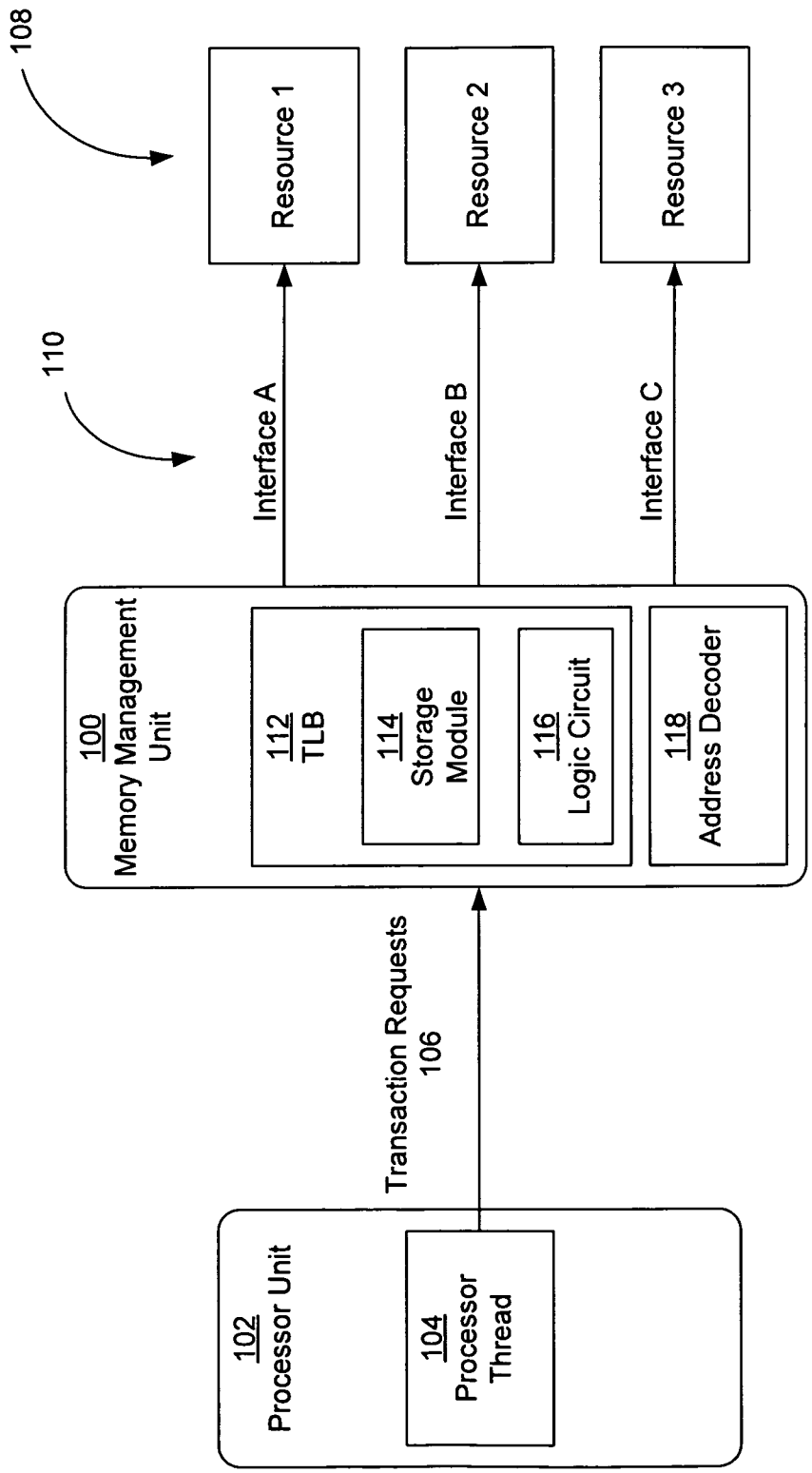
FIG. 1 is a general diagram illustrating an example of a data processing system with an embodiment of a memory management unit directing access to interfaces.

Absence of the buffer may increase the speed at which physical address can be used to access resources. FIG. 1 shows a block diagram of an implementation of one embodiment of an MMU for directing access with physical addresses. The MMU 100 can service a processor unit 102 that can include one or more processor threads 104 providing transaction requests 106 to the MMU 100. The transaction requests 106 can be requests for data, instructions, or other information from system resources 108. The MMU 100 can identify physical addresses for the resources 108 and use the physical addresses to access the resources 108 via interfaces 110.

For example, the transaction requests 106 each include a virtual address for the resource or portion of the resource the processor thread 104 is accessing. The MMU 100 can include a table or other mapping that identifies the physical address associated with the virtual address. The physical address can be used to access the resource via one of the interfaces 110. FIG. 1 illustrates interface A, interface B, interface C, which may be any type of interface and the interfaces 110 may include additional or less interfaces than is shown. Interface A is associated with resource 1, interface B is associated with resource 2, and interface C is associated with resource 3. However, each of the interfaces 110 may be associated with more than one of the resources 108 and any number of resources 108 may be included.

The MMU 100 can include components that identify the interface on which to access a resource using a particular physical address. In the embodiment shown in FIG. 1, the MMU 100 contains a TLB 112 that includes a storage module 114 and a logic circuit 116. The TLB 112 may be an instruction TLB, data TLB, or a joint TLB and include a µTLB, multiple TLBs, or one or more µTLBs and TLBs. An instruction TLB can be configured to service fetch transaction requests, a data TLB can be configured to service load or store transaction requests, and a joint TLB can be configured to service both fetch and load or store transaction requests.

The storage module 114 can store a virtual address and a physical address corresponding to the virtual address. In some embodiments, the storage module 114 includes registers or other storage devices that can store virtual addresses and a physical address corresponding to each virtual address. The storage module 114 may also store a bit or other indicator for a physical address range. The storage module 114 can include multiple physical address ranges, each being associated with a bit. The bit can indicate one of the interfaces 110 to which to provide a physical address within the physical address range for accessing a resource. As described in more detail below, the bit may be provided to the TLB 112 by an address decoder 118 that can use the physical address and system-on-a-chip (SOC) memory map strappings to identify the interface on which to route the physical address. The logic circuit 116 can use the bit to route the physical address via the identified interface for accessing a resource. In some embodiments, the logic circuit 116 includes a selector identifying the physical address stored in the TLB 112 and a multiplexer for providing the physical address and routing it to the interface identified by the bit.

MMUs according to various embodiments can include a TLB and a µTLB for increasing the speed at which physical addresses are determined using a virtual address of a transaction request. For example, a µTLB may be smaller than a TLB and used to quickly locate some physical addresses, such as those most recently or often used, using virtual addresses of transaction requests. If a lookup in the µTLB using the virtual address of the transaction request does not locate the virtual address, a lookup is made to the TLB, which is larger than the µTLB and includes additional virtual and physical address mappings. If the virtual address is located in the TLB, the virtual address and physical address are written into an entry in the µTLB.

Figure 2:
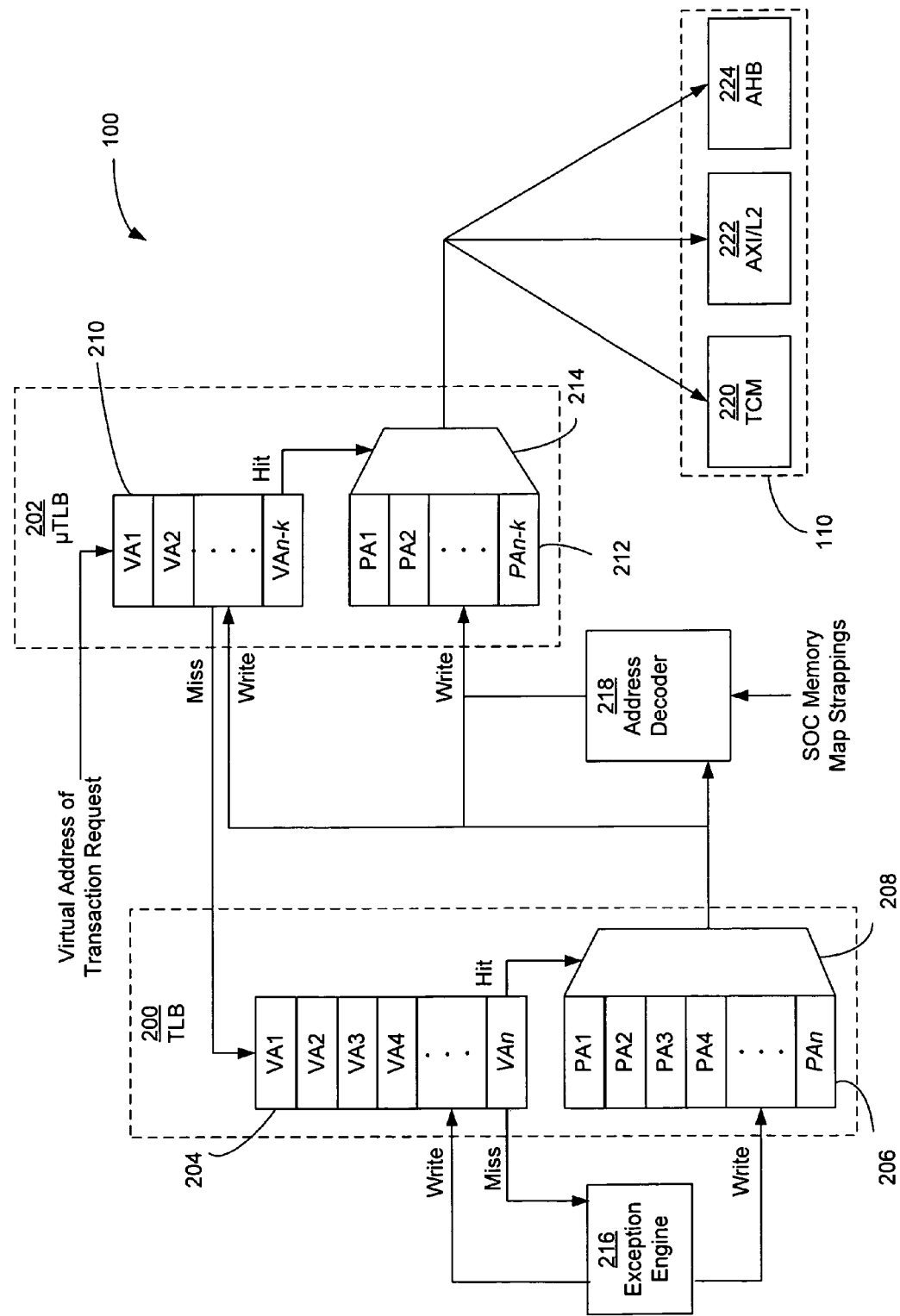
FIG. 2 is a general diagram illustrating the exemplary memory management unit and interfaces in FIG. 1.

As explained in more detail below, an indicator may be generated by an address decoder and provided to the µTLB, or additionally first to the TLB, for storage with the physical address. The indicator can identify an interface on which the physical address is routed to access a resource. FIG. 2 is a general diagram of an embodiment of the MMU 100 for using the indicator to identify an interface to route a physical address for accessing a resource. In FIG. 2, the MMU 100 includes a TLB 200 and address decoder 218, each coupled to a µTLB 202. The TLB 200 includes a TLB content accessible memory (TCAM) 204 and a TLB random access memory (TRAM) 206. The TCAM 204 includes multiple entries in which virtual addresses VA1-VAn can be stored. In some embodiments, one or more of the entries are empty and do not include a virtual address. Each virtual address can correspond to one of the physical addresses PA1-PAn stored in entries in the TRAM 206. For example, virtual address VA1 may correspond to physical address PA1. Each entry in the TRAM 206 may also include a mask that can, for example, identify a size of the memory page located at the physical address.

When a virtual address of a transaction request is received from the µTLB 202, such as after a lookup and "miss" in the SCAM 210, a lookup is performed in the TLB 200. A "miss" may be an absence of a virtual address in the SCAM 210 that matches the virtual address of the transaction request. In a TLB lookup, the virtual address of the transaction request is compared to each of the virtual addresses VA1-VAn. If a match or "hit" is found, an output that identifies the entry for the physical address associated with the matching virtual address is provided to a multiplexer 208 as a selector. The multiplexer 208 is configured to output the physical address associated with the matching virtual address based on the selector.

If a "miss" occurs in the TCAM 204—a virtual address matching the virtual address of the transaction request is not found in the TCAM 204—the virtual address of the transaction request is provided to an exception engine 216. The exception engine 216 is configured to identify a physical address and a mask for the virtual address of the transaction request. In some embodiments, the exception engine 216 writes the virtual address and its corresponding physical address in an entry into both the TCAM 204 and TRAM 206. For example, the exception engine 216 may write the virtual address into an entry in the TCAM 204 and the physical address and mask into a corresponding entry into the TRAM 206. In other embodiments, the exception engine 216 outputs the virtual address, its corresponding physical address and mask to the TLB 200 for storage in an entry. On the next lookup for the virtual address in the TLB 200, it is identified in the TCAM 204, an output identifying the entry with the physical address is provided as a selector to the multiplexer 208, and the physical address can be provided to the μTLB 202.

The μTLB 202 can include a μTLB content accessible memory (SCAM) 210 and a μTLB random access memory (μRAM) 212. The μCAM 210 can include entries in which virtual address VA1-VAn-k are stored. The SCAM 210 may be similar to the TCAM 204, but be configured to store k less virtual addresses than the TCAM 204. The GRAM 212 can include entries in which physical addresses PA1-PAn-k are stored. Each physical address stored in the GRAM 212 can correspond to one of the virtual addresses VA1-VAn-k in the SCAM 210. The μRAM 212 may be similar to the TRAM 206, but be configured to store k less physical addresses than the TRAM 206.

The μRAM 212 is configured to store a mask for each stored physical address. The mask may indicate a page size for the memory location associated with the physical address. The GRAM 212 is also configured to store indicators for physical address ranges. Each indicator may identify one of the interfaces 110 to which to route a physical address within a physical address range associated with the indicator. In some embodiments, each entry containing a physical address includes an indictor identifying one of the interfaces 110.

The indicator may be a bit identifying an interface received from the address decoder 218. For example, the address decoder 218 can receive a physical address from the TLB 200 and use system-on-a-chip (SOC) memory map strappings to determine an interface associated with the physical address. SOC memory map strappings may be predefined characteristics associated with memory built-in on a semiconductor device such as an integrated circuit. In some embodiments, the SOC memory map strappings may be programmed logic in the data processing system. Examples of SOC memory map strappings include chip pinouts for memory page locations and/or software including programmed logic. For example, a range of physical addresses may be associated with an interface via the SOC memory map strappings, such as via the chip pinouts. When the address decoder 218 receives a physical address from the TLB 200, the address decoder 218 can identify the physical address range that includes the received physical address and determine the interface associated with the identified physical address range. The address decoder 218 can be configured to provide an indicator, such as a bit, that identifies the associated interface to the μTLB 202 where may be stored or otherwise correspond to the physical address in an entry.

As stated above, the μTLB 202 may be smaller than the TLB 200. For example, the μTLB 202 may include fewer entries and, thus, fewer virtual and physical addresses than the TLB 200. In some embodiments, a lookup is performed in the SCAM 210 for a virtual address of a transaction request before a lookup is performed in the TCAM 204. If a "miss" occurs, such as the virtual address of the transaction request does not match a virtual address in the SCAM 210, the virtual address is provided to the TLB 200 for a lookup in the TCAM 204. If a "hit" occurs in the SCAM 210, such as the virtual address of the transaction request matches a virtual address in the SCAM 210, the SCAM 210 provides an output that identifies the entry for the physical address associated with the matching virtual address to a multiplexer 214 as a selector. The multiplexer 214 can be configured to output the physical address associated with the matching virtual address from the μRAM 212 based on the selector.

In some embodiments, the multiplexer 214 routes the physical address to one of the interfaces 110 based on the bit. The interfaces 110 can include any type and number of interfaces. For exemplary purposes, FIG. 2 illustrates three interfaces: tightly-coupled memory (TCM) 220, AXI/L2 222, and advanced high-performance bus (AHB) 224. In some embodiments, each of the interfaces 110 determine whether to route a physical address based on the bit instead of, or in addition to, the multiplexer 214 routing the physical address based on the bit. For example, TCM 220 may route physical addresses associated with a bit identifying it and ignore physical addresses associated with a bit identifying another interface. Instead of using a buffer or an address decoder between the μTLB 202 and the interfaces 110 that can consume power and cause backups in transaction request processing, certain embodiments can use an indicator such as a bit in the μTLB 202 to identify the interface to which to route a particular physical address.

Figure 3:
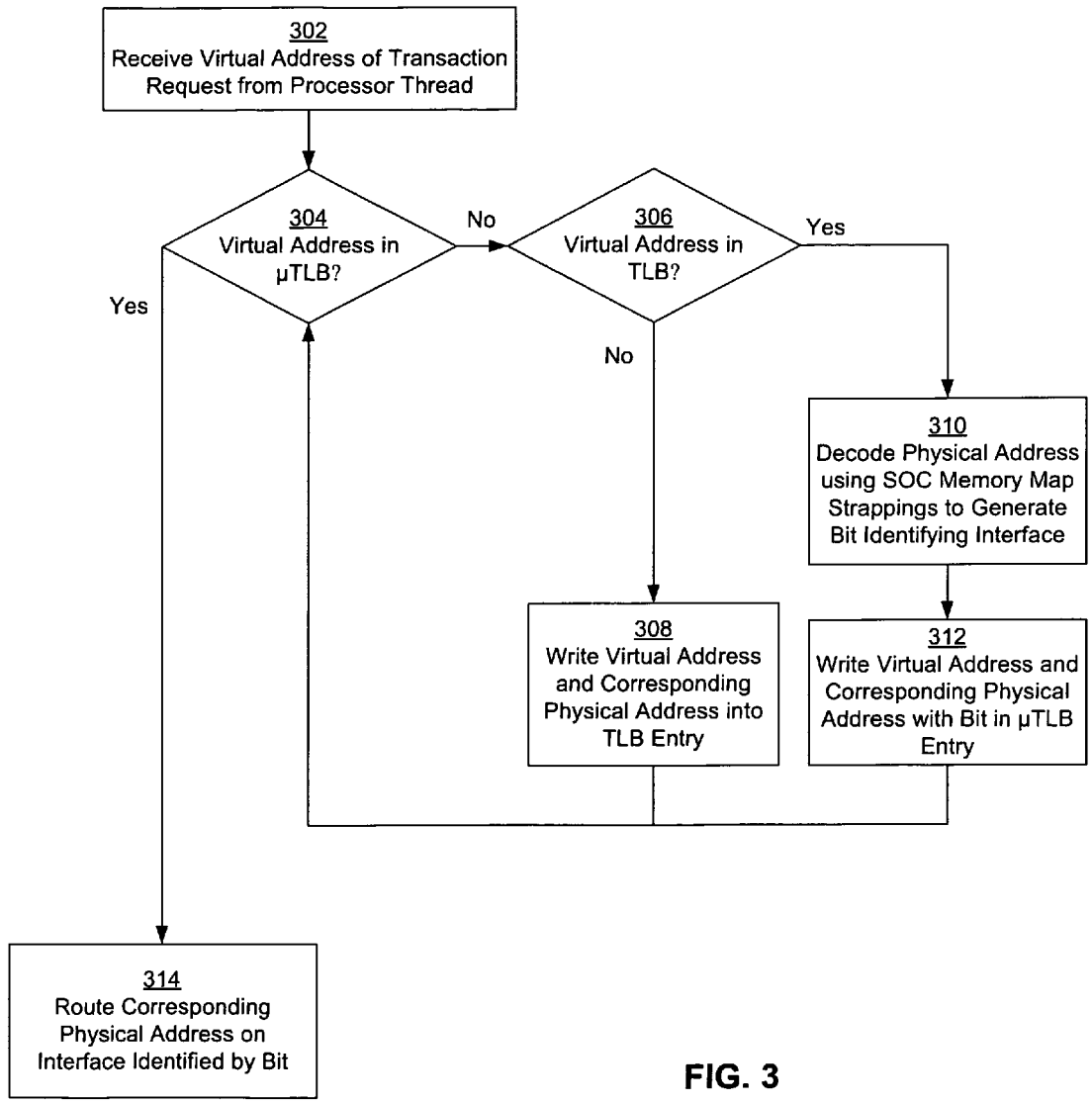
FIG. 3 is a flow chart illustrating an exemplary process for directing access to interfaces for transaction requests.

FIG. 3 illustrates a method for using MMUs to direct physical addresses to an interface based on a bit according to some embodiments of the inventive concepts disclosed. The flow diagram of FIG. 3 is described with reference to the components illustrated in FIG. 2. However, other implementations are possible.

The method begins in block 302 when the MMU 100 receives a virtual address of a transaction request from a processor thread. For example, a process thread can provide a transaction request that includes a request for data, instructions, or other information from a resource. The transaction request can include a virtual address of the resource from which the data, instructions, or other information requested by the processor thread can be accessed.

In block 304, the MMU 100 determines if the virtual address is in the μTLB 202. In some embodiments, a lookup is performed on the SCAM 210 to determine if a virtual address stored in an entry in the SCAM 210 matches the virtual address of the transaction request. For example, each virtual address in the SCAM 210 is compared to the virtual address of the transaction request until a match is found or each virtual address in the SCAM 210 has been compared to the virtual address of the transaction request without a match.

If a "miss" occurs, such as a match is not found, the MMU 100 determines if the virtual address is in the TLB 200 in block 306. For example, a lookup may be performed in the TCAM 204 to determine if a virtual address stored in an entry in the TCAM 204 matches the virtual address of the transaction request.

If a "miss" occurs in the TCAM 204, the exception engine 216 determines a physical address for the virtual address and writes the virtual address and physical address to an entry in the TLB 200 in block 308. For example, the exception engine 216 may write the virtual address to an entry in the TCAM 204 and the physical address to a corresponding entry in the TRAM 206. In some embodiments a mask indicating a page size of the memory associated with the physical address is generated by the exception engine 216 and associated with the physical address in the TRAM 206.

After writing the entry, the method returns to block 304 and a lookup is performed on the μTLB 202 with the virtual address. A "miss" may occur again and a lookup is performed on the TLB 200 for the virtual address in block 306. If a "hit" occurs, such as a virtual address stored in the TCAM 204 matches the virtual address of the transaction request, the corresponding physical address is provided by the TLB 200. For example, the TCAM 204 may provide an output indicating the corresponding physical address and/or its entry location as a selector to the multiplexer 208 associated with the TRAM 206. The multiplexer 208 may be configured to output the physical address from the TRAM 206 based on the selector.

In block 310, the address decoder 218 decodes the physical address from the TRAM 206 using SOC memory map strappings to generate a bit indicating an interface associated with the physical address. For example, the address decoder 218 may use chip pinouts or predefined physical characteristics to identify an interface associated with a physical address range that includes the physical address. As stated above, some embodiments of the MMU 100 may identify an interface associated with a physical address when writing an entry to a TLB instead of when writing to the μTLB 202.

In block 312, the MMU 100 writes an entry in the μTLB 202 for the virtual address, its corresponding physical address, and the bit indicating the interface associated with the physical address. For example, the MMU 100 may store the virtual address in an entry in the SCAM 210 and the physical address in an entry in the μRAM 212. The MMU 100 can also store the mask and the bit indicating the interface associated with the physical address in the μRAM 212.

The method may return to block 304 where the MMU 100 performs a lookup in the μTLB 202. If a "hit" occurs, the μTLB 202 can route the physical address for accessing a resource to an interface based on the bit in block 314. For example, the lookup can result in a match of a virtual address in the SCAM 210. The SCAM 210 provides an output indicating the corresponding physical address and/or its entry location as a selector to the multiplexer 214 associated with the μRAM 212. The multiplexer 214 may be configured to output the physical address from the GRAM 212 based on the selector. In some embodiments, the μTLB 202 routes the physical address to the interface identified by the bit. In other embodiments, the bit is provided with the physical address and the interface identified by the bit routes the physical address while the other interfaces ignore the physical address.

Figure 4:
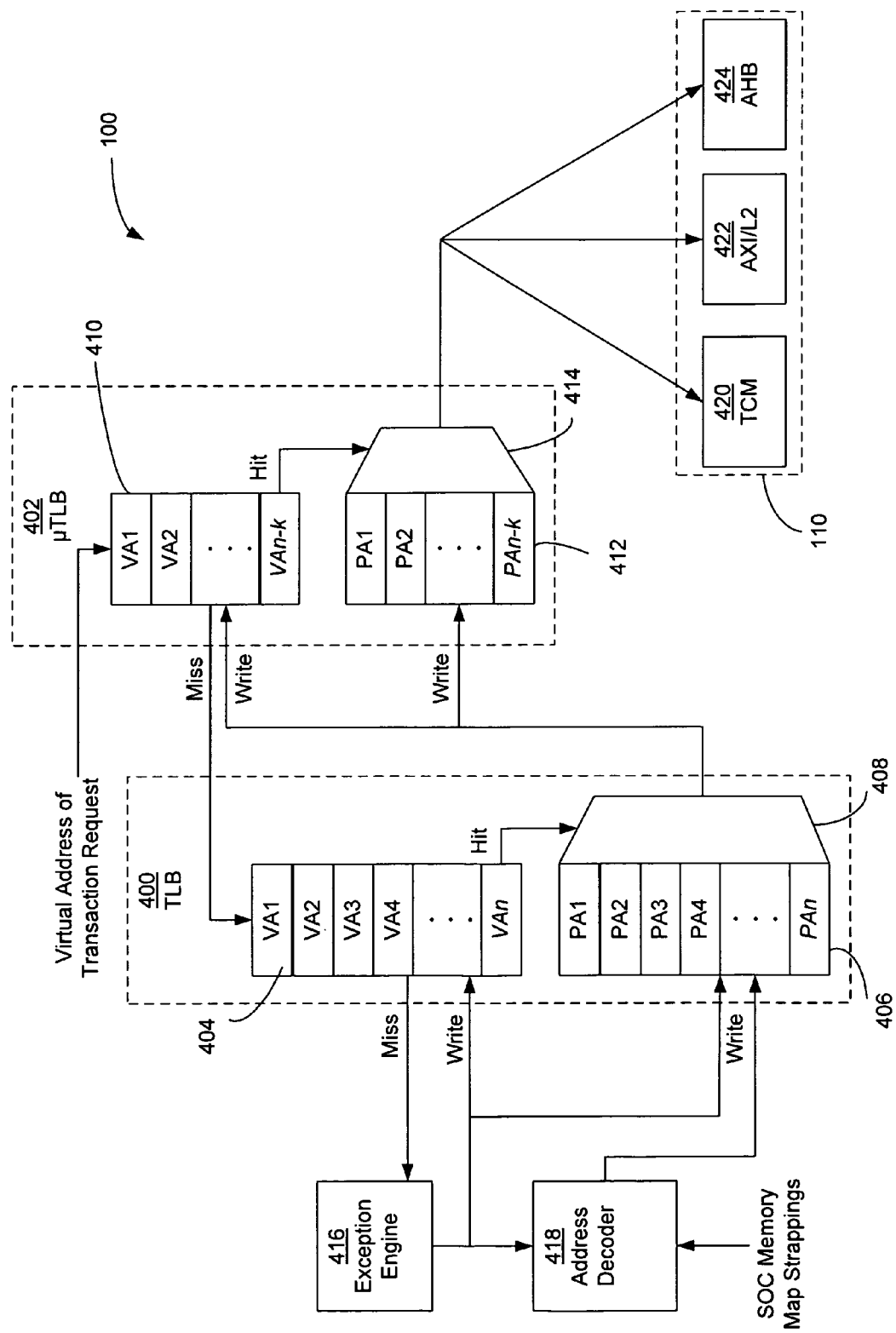
FIG. 4 is a general diagram of a second exemplary memory management unit directing access to interfaces.

Address decoders according to some embodiments may be located in an MMU to provide a TLB, in addition to a μTLB, with indicators identifying interfaces to which to route a physical addresses. FIG. 4 illustrates a second embodiment of MMU 100 with a configuration that can provide a bit identifying an interface for a physical address to a TLB 400 when entries in the TLB 400 are written. The MMU 100 in FIG. 4 includes a μTLB 402 that includes a SCAM 410 in which a lookup can be performed with a virtual address from a transaction request. If a "miss" occurs, the virtual address is provided to a TCAM 404 and a lookup is performed for the TLB 400.

If a "miss" occurs in the TCAM 404, the virtual address is provided to an exception engine 416 that identifies a physical address for the virtual address. In some embodiments, the exception engine 416 can also determine a mask for the physical address that identifies the page size of the memory associated with the physical address. The physical address can be provided to an address decoder 418 that uses SOC memory map strappings to generate a bit identifying an interface for the physical address. The virtual address can be written in an entry in the TCAM 404 and the physical address, along with the bit and mask, can be written in a corresponding entry in the TRAM 406. When a "hit" occurs in the TCAM 404, the physical address, bit, and mask can be provided to the μTLB 402 using multiplexer 408. The virtual address can be written in an entry in the SCAM 410 and the physical address, bit, and mask can be written in a corresponding entry in the GRAM 412.

When a "hit" occurs in the SCAM 410, the physical address can be routed to one of the interfaces 110 using multiplexer 414. The bit can be used to determine which interface to route the physical address to access the resource.

Example Devices Including the Above Described Features

Memory management units (MMUs) may be included in any processors, such as digital signal processors. The general diagrams of FIGS. 5-9 illustrate example devices that may incorporate MMUs for managing access to interfaces by transaction requests provided by a thread of a processor or threads of a multi-threaded processor to device resources.

Figure 5:
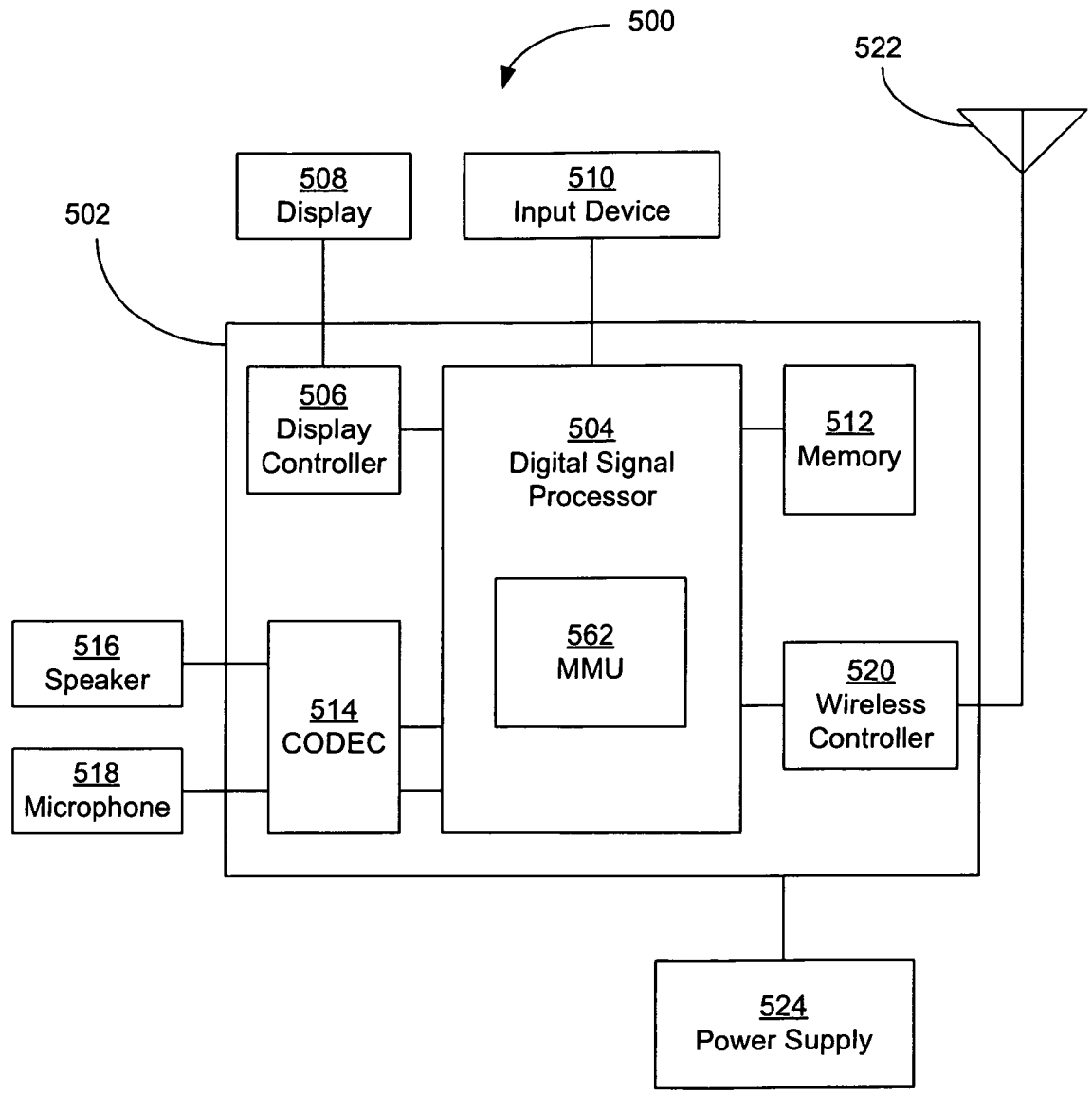
FIG. 5 is a general diagram illustrating an example portable communication device that may include a memory management unit.

FIG. 5 is a diagram illustrating an exemplary embodiment of a portable communication device 500. As illustrated in the general diagram of FIG. 5, the portable communication device includes an on-chip system 502 that includes a digital signal processor (DSP) 504. The general diagram of FIG. 5 also shows a display controller 506 that is coupled to the digital signal processor 504 and a display 508. Moreover, an input device 510 is coupled to the DSP 504. As shown, a memory 512 is coupled to the DSP 504. Additionally, a coder/decoder (CODEC) 514 may be coupled to the DSP 504. A speaker 516 and a microphone 518 may be coupled to the CODEC 514.

The general diagram of FIG. 5 further illustrates a wireless controller 520 coupled to the digital signal processor 504 and a wireless antenna 522. In a particular embodiment, a power supply 524 is coupled to the on-chip system 502. Moreover, in a particular embodiment, as illustrated in FIG. 5, the display 526, the input device 530, the speaker 516, the microphone 518, the wireless antenna 522, and the power supply 524 are external to the on-chip system 502. However, each is coupled to a component of the on-chip system 502.

In a particular embodiment, the DSP 504 includes a memory management unit (MMU) 526 that can direct access to interfaces by transaction requests from threads. For example, the MMU 526 may be as described with reference to FIG. 2 or 4 and include a micro translation lookaside buffer (μTLB) that can receive a bit indicating the interface to direct the transaction request to decrease processing delays.

Figure 6:
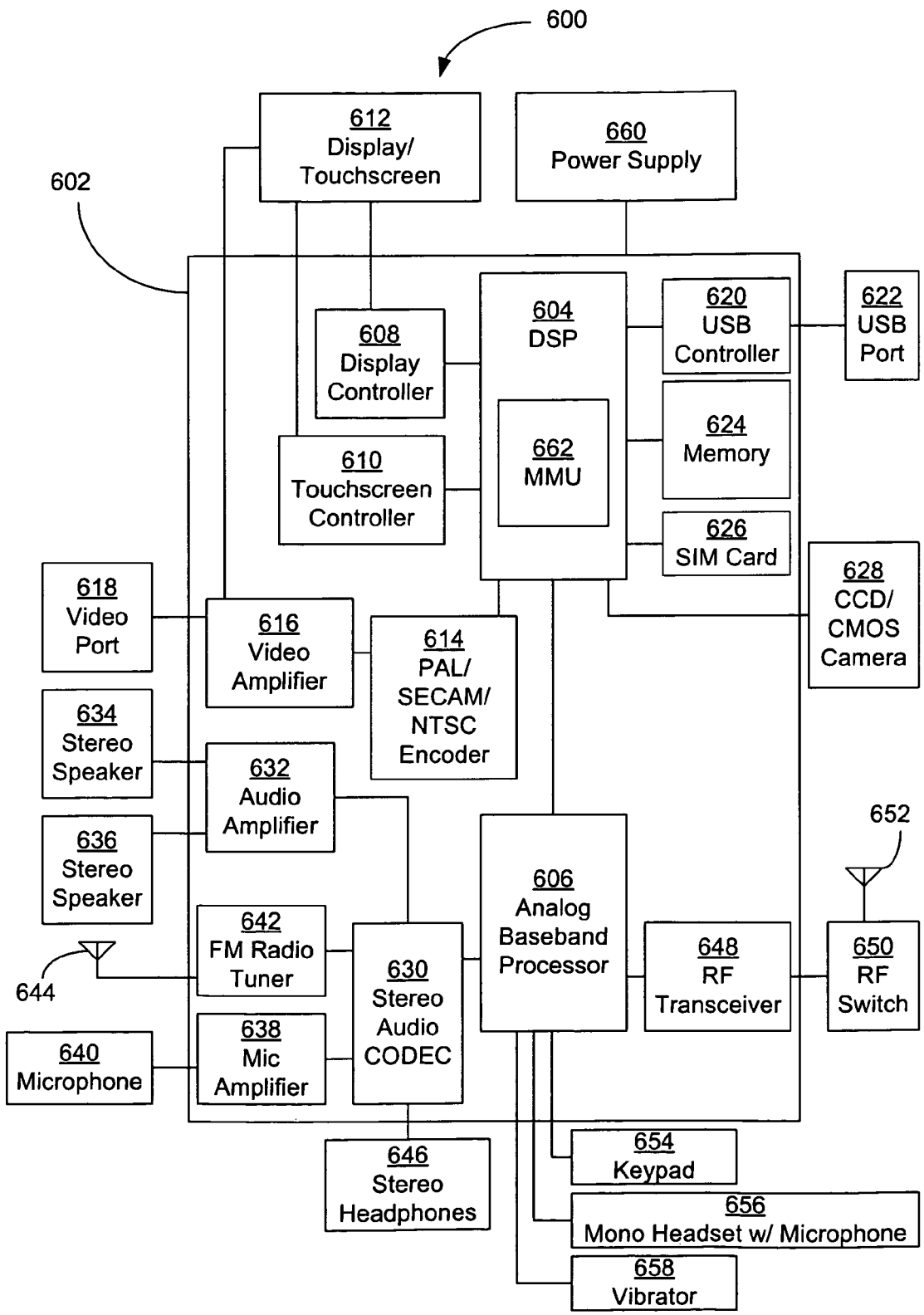
FIG. 6 is a general diagram illustrating an example cellular telephone that may include a memory management unit.

FIG. 6 is a diagram illustrating an exemplary embodiment of a cellular telephone 600. As shown, the cellular telephone 600 includes an on-chip system 602 that includes a digital baseband processor 604 and an analog baseband processor 606 that are coupled together. In a particular embodiment, the digital baseband processor 604 is a digital signal processor. As illustrated in the general diagram of FIG. 6, a display controller 608 and a touchscreen controller 610 are coupled to the digital baseband processor 604. In turn, a touchscreen display 612 external to the on-chip system 602 is coupled to the display controller 608 and the touchscreen controller 610.

The general diagram of FIG. 6 further illustrates a video encoder 614, e.g., a phase alternating line (PAL) encoder, a sequential couleur a memoire (SECAM) encoder, or a national television system(s) committee (NTSC) encoder, is coupled to the digital baseband processor 604. Further, a video amplifier 616 is coupled to the video encoder 614 and the touchscreen display 612. Also, a video port 618 is coupled to the video amplifier 616. A universal serial bus (USB) controller 620 is coupled to the digital baseband processor 604. Also, a USB port 622 is coupled to the USB controller 620. A memory 624 and a subscriber identity module (SIM) card 626 may also be coupled to the digital baseband processor 604. Further, as shown in the general diagram of FIG. 6, a digital camera 628 may be coupled to the digital baseband processor 604. In an exemplary embodiment, the digital camera 628 is a charge-coupled device (CCD) camera or a complementary metal-oxide semiconductor (CMOS) camera.

As further illustrated in the general diagram of FIG. 6, a stereo audio CODEC 630 may be coupled to the analog baseband processor 606. Moreover, an audio amplifier 632 may be coupled to the stereo audio CODEC 630. In an exemplary embodiment, a first stereo speaker 634 and a second stereo speaker 636 are coupled to the audio amplifier 632. A microphone amplifier 638 may be also coupled to the stereo audio CODEC 630. Additionally, a microphone 640 may be coupled to the microphone amplifier 638. In a particular embodiment, a frequency modulation (FM) radio tuner 642 may be coupled to the stereo audio CODEC 630. An FM antenna 644 can be coupled to the FM radio tuner 642. Further, stereo headphones 646 may be coupled to the stereo audio CODEC 630.

The general diagram of FIG. 6 further illustrates a radio frequency (RF) transceiver 648 that may be coupled to the analog baseband processor 606. An RF switch 650 may be coupled to the RF transceiver 648 and an RF antenna 652. A keypad 654 may be coupled to the analog baseband processor 606. Also, a mono headset with a microphone 656 may be coupled to the analog baseband processor 606. Further, a vibrator device 658 may be coupled to the analog baseband processor 606. The general diagram of FIG. 6 also shows a power supply 660 that may be coupled to the on-chip system 602. In a particular embodiment, the power supply 660 is a direct current (DC) power supply that provides power to the various components of the cellular telephone 600. Further, in a particular embodiment, the power supply is a rechargeable DC battery or a DC power supply that is derived from an alternating current (AC) to DC transformer that is coupled to an AC power source.

As depicted in the general diagram of FIG. 6, the touch-screen display 612, the video port 618, the USB port 622, the camera 628, the first stereo speaker 634, the second stereo speaker 636, the microphone 640, the FM antenna 644, the stereo headphones 646, the RF switch 648, the RF antenna 650, the keypad 652, the mono headset 656, the vibrator 658, and the power supply 660 may be external to the on-chip system 602.

In a particular embodiment, the digital baseband processor 604 includes a memory management unit (MMU) 626 that can direct access to interfaces by transaction requests from threads. For example, the MMU 662 may be as described with reference to FIG. 2 or 4 and include a micro translation lookaside buffer (μTLB) that can receive a bit indicating the interface to direct the transaction request to decrease processing delays.

Figure 7:
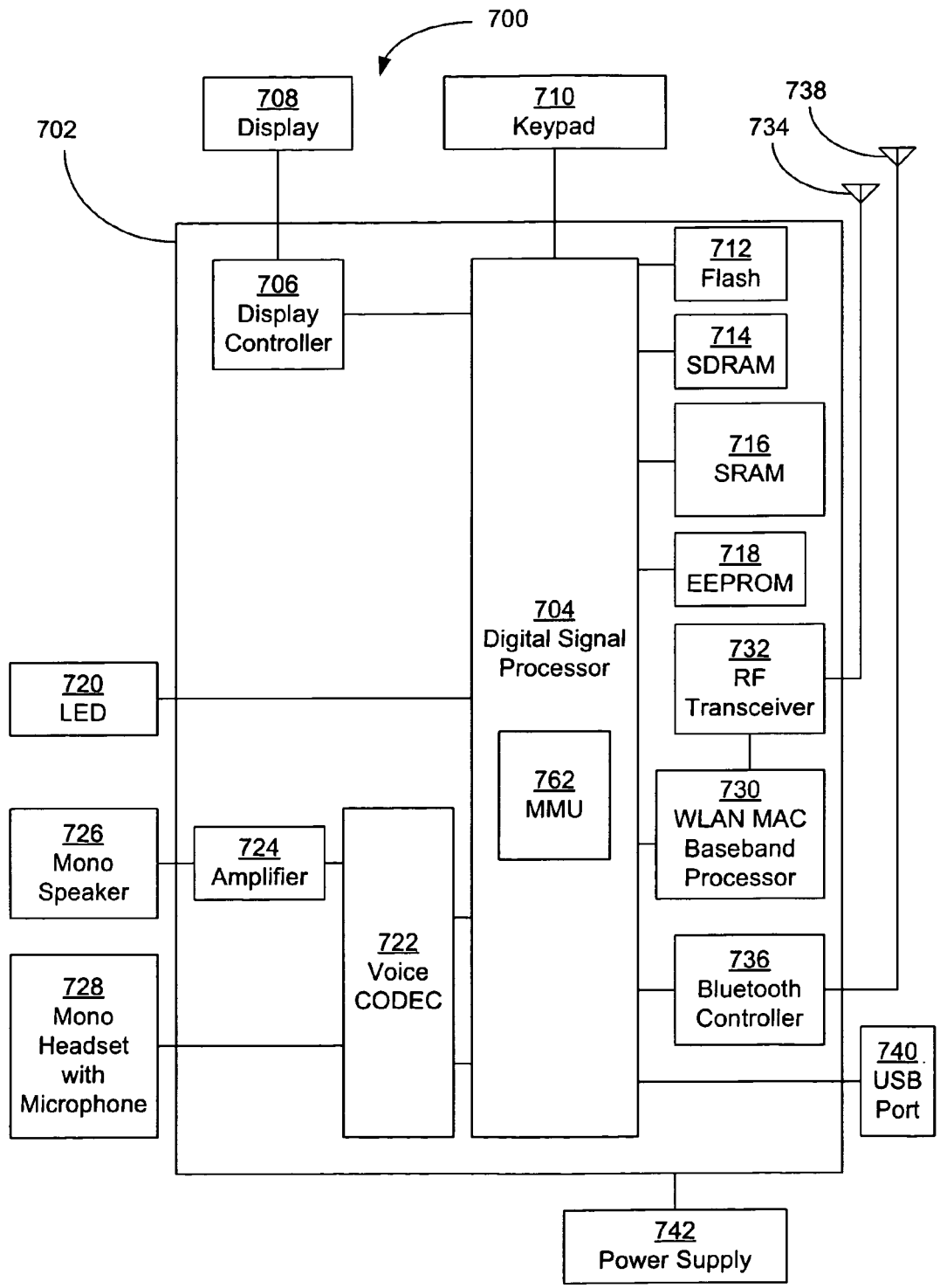
FIG. 7 is a general diagram illustrating an example wireless Internet Protocol telephone that may include a memory management unit.

FIG. 7 is a diagram illustrating an exemplary embodiment of a wireless Internet protocol (IP) telephone 700. As shown, the wireless IP telephone 700 includes an on-chip system 702 that includes a digital signal processor (DSP) 704. A display controller 706 may be coupled to the DSP 704 and a display 708 is coupled to the display controller 706. In an exemplary embodiment, the display 708 is a liquid crystal display (LCD). FIG. 7 further shows that a keypad 710 may be coupled to the DSP 704.

A flash memory 712 may be coupled to the DSP 704. A synchronous dynamic random access memory (SDRAM) 714, a static random access memory (SRAM) 716, and an electrically erasable programmable read only memory (EEPROM) 718 may also be coupled to the DSP 704. The general diagram of FIG. 7 also shows that a light emitting diode (LED) 720 may be coupled to the DSP 704. Additionally, in a particular embodiment, a voice CODEC 722 may be coupled to the DSP 704. An amplifier 724 may be coupled to the voice CODEC 722 and a mono speaker 726 may be coupled to the amplifier 724. The general diagram of FIG. 7 further illustrates a mono headset 728 coupled to the voice CODEC 722. In a particular embodiment, the mono headset 728 includes a microphone.

A wireless local area network (WLAN) baseband processor 730 may be coupled to the DSP 704. An RF transceiver 732 may be coupled to the WLAN baseband processor 730 and an RF antenna 734 may be coupled to the RF transceiver 732. In a particular embodiment, a Bluetooth controller 736 may also be coupled to the DSP 704 and a Bluetooth antenna 738 may be coupled to the controller 736. The general diagram of FIG. 7 also shows that a USB port 740 may also be coupled to the DSP 704. Moreover, a power supply 742 is coupled to the on-chip system 702 and provides power to the various components of the wireless IP telephone 700.

As indicated in the general diagram of FIG. 7, the display 708, the keypad 710, the LED 720, the mono speaker 726, the mono headset 728, the RF antenna 734, the Bluetooth antenna 738, the USB port 740, and the power supply 742 may be external to the on-chip system 702 and coupled to one or more components of the on-chip system 702. In a particular embodiment, the DSP 704 includes a memory management unit (MMU) 726 that can direct access to interfaces by transaction requests from threads. For example, the MMU 762 may be as described with reference to FIG. 2 or 4 and include a micro translation lookaside buffer (μTLB) that can receive a bit indicating the interface to direct the transaction request to decrease processing delays.

Figure 8:
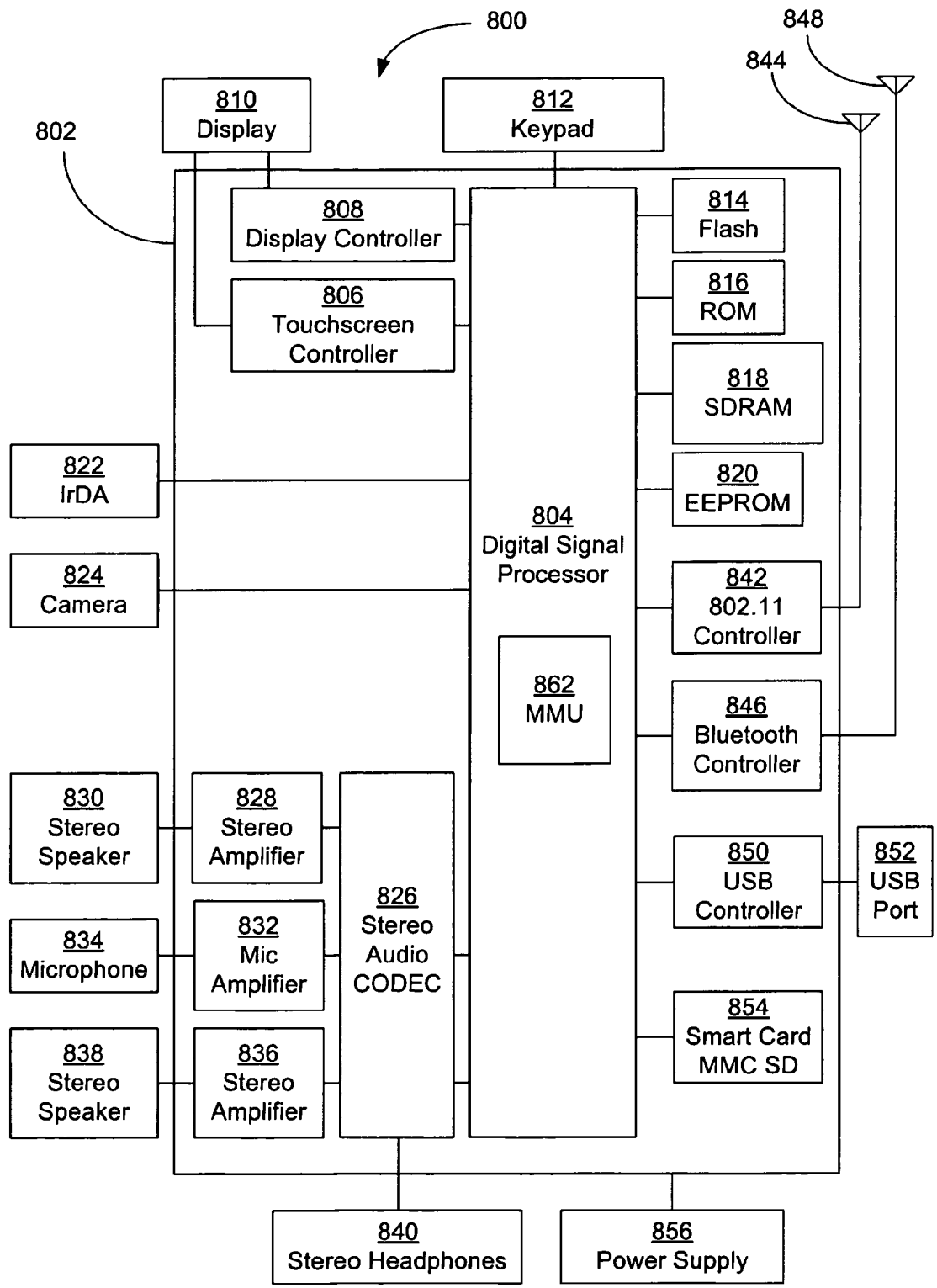
FIG. 8 is a general diagram illustrating an example portable digital assistant that may include a memory management unit.

FIG. 8 is a diagram illustrating an exemplary embodiment of a portable digital assistant (PDA) 800. As shown, the PDA 800 includes an on-chip system 802 that includes a digital signal processor (DSP) 804. A touchscreen controller 806 and a display controller 808 are coupled to the DSP 804. Further, a touchscreen display 810 is coupled to the touchscreen controller 806 and to the display controller 808. The general diagram of FIG. 8 also indicates that a keypad 812 may be coupled to the DSP 804.

In a particular embodiment, a stereo audio CODEC 826 may be coupled to the DSP 804. A first stereo amplifier 828 may be coupled to the stereo audio CODEC 826 and a first stereo speaker 830 may be coupled to the first stereo amplifier 828. Additionally, a microphone amplifier 832 may be coupled to the stereo audio CODEC 826 and a microphone 834 may be coupled to the microphone amplifier 832. The general diagram of FIG. 8 further shows a second stereo amplifier 836 that may be coupled to the stereo audio CODEC 826 and a second stereo speaker 838 that may be coupled to the second stereo amplifier 836. In a particular embodiment, stereo headphones 840 may also be coupled to the stereo audio CODEC 826.

The general diagram of FIG. 8 also illustrates an 802.11 controller 842 that may be coupled to the DSP 804 and an 802.11 antenna 844 that may be coupled to the 802.11 controller 842. Moreover, a Bluetooth controller 846 may be coupled to the DSP 804 and a Bluetooth antenna 848 may be coupled to the Bluetooth controller 846. A USB controller 850 may be coupled to the DSP 804 and a USB port 852 may be coupled to the USB controller 850. Additionally, a smart card 854, e.g., a multimedia card (MMC) or a secure digital card (SD), may be coupled to the DSP 804. Further, a power supply 856 may be coupled to the on-chip system 802 and may provide power to the various components of the PDA 800.

As indicated in the general diagram of FIG. 8, the display 810, the keypad 812, the IrDA port 822, the digital camera 824, the first stereo speaker 830, the microphone 834, the second stereo speaker 838, the stereo headphones 840, the 802.11 antenna 844, the Bluetooth antenna 848, the USB port 852, and the power supply 850 may be external to the on-chip system 802 and coupled to one or more components on the on-chip system 802. In a particular embodiment, the DSP 804 includes a memory management unit (MMU) 862 that can direct access to interfaces by transaction requests from threads. For example, the MMU 862 may be as described with reference to FIG. 2 or 4 and include a micro translation lookaside buffer (μTLB) that can receive a bit indicating the interface to direct the transaction request to decrease processing delays.

Figure 9:
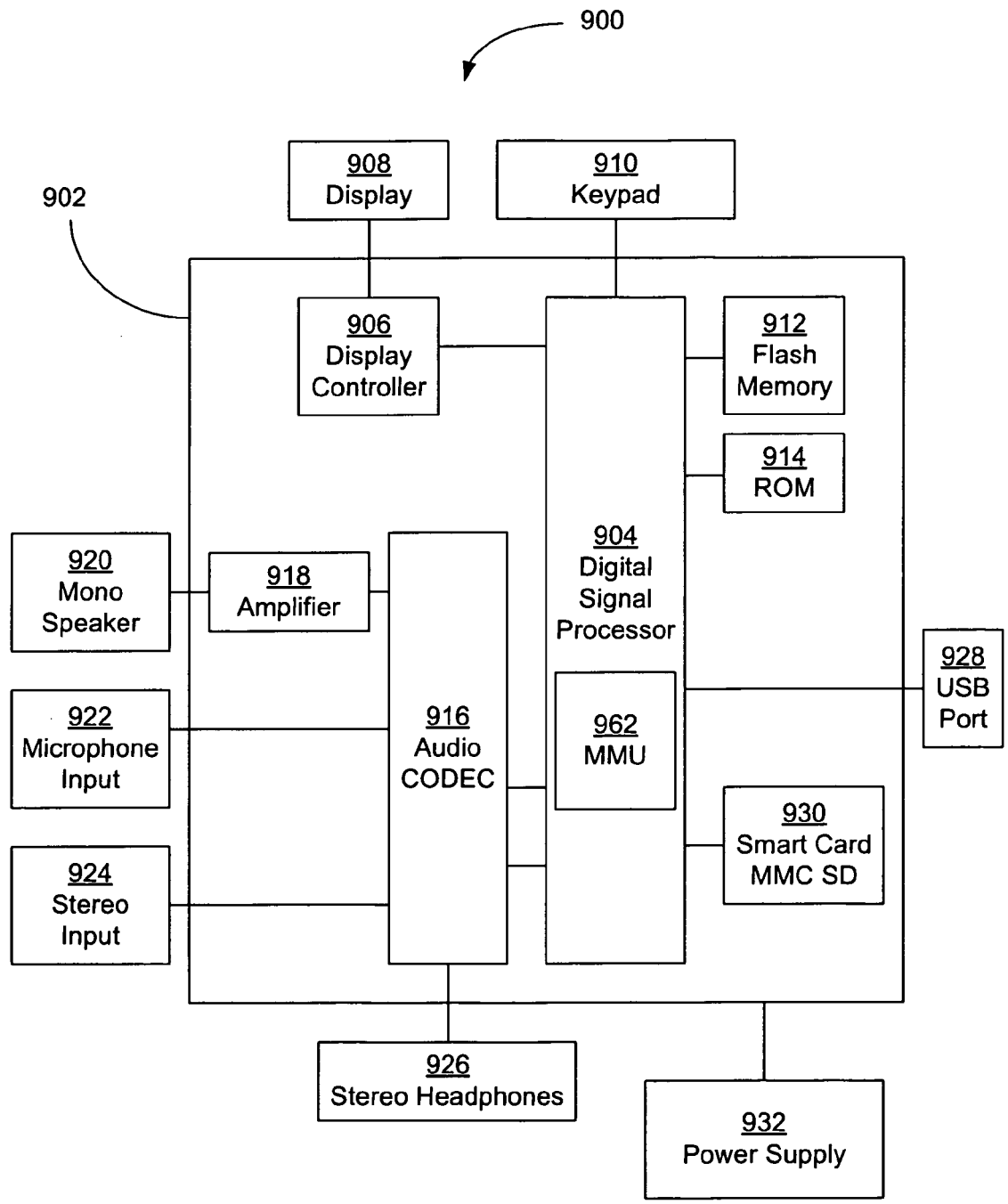
FIG. 9 is a general diagram illustrating an example audio file player that may include a memory management unit.

FIG. 9 is a diagram illustrating an exemplary embodiment of an audio file player (e.g., MP3 player) 900. As shown, the audio file player 900 includes an on-chip system 902 that includes a digital signal processor (DSP) 904. A display controller 906 may be coupled to the DSP 904 and a display 908 is coupled to the display controller 906. In an exemplary embodiment, the display 908 is a liquid crystal display (LCD). A keypad 910 may be coupled to the DSP 904.

As further depicted in the general diagram of FIG. 9, a flash memory 912 and a read only memory (ROM) 914 may be coupled to the DSP 904. Additionally, in a particular embodiment, an audio CODEC 916 may be coupled to the DSP 904. An amplifier 918 may be coupled to the audio CODEC 916 and a mono speaker 920 may be coupled to the amplifier 918. The general diagram of FIG. 9 further indicates that a microphone input 922 and a stereo input 924 may also be coupled to the audio CODEC 916. In a particular embodiment, stereo headphones 926 may also be coupled to the audio CODEC 916.

A USB port 928 and a smart card 930 may be coupled to the DSP 904. Additionally, a power supply 932 may be coupled to the on-chip system 902 and may provide power to the various components of the audio file player 900.

As indicated in the general diagram of FIG. 9 the display 908, the keypad 910, the mono speaker 920, the microphone input 922, the stereo input 924, the stereo headphones 926, the USB port 928, and the power supply 932 are external to the on-chip system 902 and coupled to one or more components on the on-chip system 902. In a particular embodiment, the DSP 904 includes a memory management unit (MMU) 926 that can direct access to interfaces by transaction requests from threads. For example, the MMU 962 may be as described with reference to FIG. 2 or 4 and include a micro translation lookaside buffer (μTLB) that can receive a bit indicating the interface to direct the transaction request to decrease processing delays.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A translation lookaside buffer (TLB) comprising:
a storage module configured to store a bit indicating one interface of a plurality of interfaces, the bit being associated with a physical address range; and
a logic circuit configured to route a physical address within the physical address range to the one of the plurality of interfaces based on the bit,
wherein the storage module is configured to receive the bit from an address decoder that generates the bit using system-on-a-chip (SOC) memory map strappings.

2. A translation lookaside buffer (TLB) comprising:
a storage module configured to store a bit indicating one interface of a plurality of interfaces, the bit being associated with a physical address range; and
a logic circuit configured to route a physical address within the physical address range to the one of the plurality of interfaces based on the bit,
wherein the TLB has a size and the storage module is configured to receive the bit from a second TLB having a larger size than the TLB size.

3. The TLB of claim 2, wherein the TLB is a micro translation lookaside buffer (μTLB).

4. The TLB of claim 1, wherein the storage module comprises:
a content accessible memory (CAM) configured to store a virtual address associated with the physical address; and
a random access memory (RAM) configured to store the bit and the physical address.

5. The TLB of claim 4, wherein the logic circuit comprises:
a selector from the CAM configured to indicate the physical address; and
a multiplexer associated with the RAM, the multiplexer being configured to route the physical address based on the selector and the bit.

6. The TLB of claim 1 wherein the TLB is disposed in a portable communication device.

7. A memory management unit (MMU) comprising:
an address decoder configured to provide a bit identifying one interface of a plurality of interfaces for a transaction request from a processor thread, the bit being associated with a physical address range;
a first translation lookaside buffer (TLB) comprising:
a storage module configured to associate a physical address within the physical address range with the bit; and
a logic circuit configured to route the physical address to the one interface of the plurality of interfaces based on the bit,
wherein the address decoder is configured to determine the bit using system-on-a-chip (SOC) memory map strappings and the physical address.

8. The MMU of claim 7, wherein the SOC memory map strappings comprise programmed logic.

9. The MMU of claim 7, further comprising a second TLB configured to receive the physical address and a virtual address associated with the physical address from an exception engine and provide the physical address to the first TLB.

10. The MMU of claim 9, wherein the second TLB is configured to receive the bit from the address decoder and store the physical address and the bit in an entry.

11. The MMU of claim 7, wherein the storage module comprises:
a content accessible memory (CAM) configured to store a virtual address associated with the physical address; and
a random access memory (RAM) configured to store the bit and the physical address.

12. The MMU of claim 11, wherein the logic circuit comprises:
a selector from the CAM configured to indicate the physical address; and a multiplexer associated with the RAM, the multiplexer being configured to route the physical address based on the selector and the bit.

13. The MMU of claim 7, wherein the MMU is disposed in a portable communication device.

14. A method comprising:
   receiving a transaction request from a processor thread, the transaction request comprising a virtual address;
   identifying a physical address corresponding to the virtual address;
   decoding the physical address using system-on-a-chip (SOC) memory map strappings to provide a bit identifying one interface of a plurality of interfaces, the bit being associated with a physical address range;
   storing the physical address and the bit in a micro translation lookaside buffer (µTLB);
   identifying the virtual address in the µTLB; and
   routing the physical address to the one interface of the plurality of interfaces based on the bit, the physical address being within the physical address range.

15. The method of claim 14, further comprising:
   storing the physical address in a translation lookaside buffer (TLB); and
   providing the physical address to the µTLB from the TLB.

16. The method of claim 15, further comprising:
   providing the physical address to the address decoder from the TLB.

17. The method of claim 15, further comprising:
   receiving the bit at the TLB;
   storing the bit with the physical address in the TLB; and
   providing the bit with the physical address to the µTLB from the TLB.

18. The method of claim 14, further comprising:
   determining the µTLB does not initially include the virtual address;
   determining the TLB does not initially include the virtual address;
   storing the virtual address and the physical address in at least one entry in the TLB; and
   wherein storing the physical address and the bit in the µTLB comprises storing the virtual address, physical address, and the bit in at least one entry in the µTLB.

19. The method of claim 14, wherein routing the physical address to the one of the plurality of interfaces based on the bit comprises using the bit to identify the one of the plurality of interfaces to which to route the physical address.

20. A memory management apparatus comprising:
   means for receiving a transaction request from a processor thread, the transaction request comprising a virtual address;
   means for identifying a physical address corresponding to the virtual address;
   means for providing a bit identifying one interface of a plurality of interfaces, the bit being associated with a physical address range, wherein the means for providing the bit identifying one interface of the plurality of interfaces is configured to provide the bit by decoding the physical address using system-on-a-chip (SOC) memory map strappings;
   means for storing the physical address and the bit in a micro translation lookaside buffer (µTLB);
   means for identifying the virtual address in the µTLB; and
   means for routing the physical address to the one interface of the plurality of interfaces based on the bit, the physical address being within the physical address range.

21. The apparatus if claim 20, further comprising:
   means for storing the physical address in a translation lookaside buffer (TLB); and
   means for providing the physical address to the µTLB from the TLB.

22. The apparatus of claim 21, further comprising:
   means for providing the physical address to the address decoder from the TLB.

23. The apparatus of claim 21, further comprising:
   receiving the bit at the TLB;
   storing the bit with the physical address in the TLB; and
   providing the bit with the physical address to the µTLB from the TLB.

24. The apparatus of claim 20, further comprising:
   determining the µTLB does not initially include the virtual address;
   determining the TLB does not initially include the virtual address;
   storing the virtual address and the physical address in at least one entry in the TLB; and
   wherein storing the physical address and the bit in the µTLB comprises storing the virtual address, physical address, and the bit in at least one entry in the µTLB.

25. A computer product having a computer readable medium comprising instructions that, when read and executed by a processor, cause the processor to
   receive a transaction request from a processor thread, the transaction request comprising a virtual address;
   identify a physical address corresponding to the virtual address;
   provide a bit identifying one interface of a plurality of interfaces, the bit being associated with a physical address range, by decoding the physical address using system-on-a-chip (SOC) memory map strappings;
   store the physical address and the bit in a micro translation lookaside buffer (µTLB);
   identify the virtual address in the µTLB; and
   route the physical address to the one interface of the plurality of interfaces based on the bit, the physical address being within the physical address range.
storing the physical address in a translation lookaside buffer (TLB); and
   providing the physical address to the µTLB from the TLB.

26. The computer product of claim 25, wherein the computer readable medium further comprises instructions that, when read and executed by a processor, cause the processor to:
   provide the physical address to the address decoder from the TLB.

27. The computer product of claim 25, wherein the computer readable medium further comprises instructions that, when read and executed by a processor, cause the processor to:
   receive the bit at the TLB;
   store the bit with the physical address in the TLB; and
   provide the bit with the physical address to the µTLB from the TLB.

28. The computer product of claim 25, wherein the computer readable medium further comprises instructions that, when read and executed by a processor, cause the processor to:
   determine the µTLB does not initially include the virtual address;
   determine the TLB does not initially include the virtual address;

store the virtual address and the physical address in at least one entry in the TLB; and wherein store the physical address and the bit in the µTLB comprises store the virtual address, physical address, and the bit in at least one entry in the µTLB.

* * * * *